(12) United States Patent
Ippoliti et al.

(10) Patent No.: US 7,799,426 B2
(45) Date of Patent: Sep. 21, 2010

(54) NANOPARTICLE STRUCTURES COMPRISING SILICON OXIDE-BASED POLYMER, AND COMPOSITE MATERIALS

(75) Inventors: J. Thomas Ippoliti, Woodbury, MN (US); Scott R. Schewe, Eden Prairie, MN (US); Liliana L. Atanasoska, Edina, MN (US); Robert W. Warner, Woodbury, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

(21) Appl. No.: 12/266,984

(22) Filed: Nov. 7, 2008

(65) Prior Publication Data

US 2009/0062483 A1 Mar. 5, 2009

Related U.S. Application Data

(63) Continuation of application No. 11/317,963, filed on Dec. 23, 2005, now Pat. No. 7,470,466.

(51) Int. Cl.
B32B 5/16 (2006.01)
(52) U.S. Cl. ............... 428/403; 428/447; 428/448; 977/778; 977/783
(58) Field of Classification Search ............ 428/403, 428/447, 448; 977/778, 783
See application file for complete search history.

(56) References Cited

U.S. PATENT DOCUMENTS

| | | | |
|---|---|---|---|
| 4,780,337 A | 10/1988 | Seyferth et al. | |
| 5,254,744 A | 10/1993 | Neumer | |
| 5,389,170 A | 2/1995 | Brady et al. | |
| 5,486,565 A | 1/1996 | Gentle et al. | |
| 5,665,823 A | 9/1997 | Saxena et al. | |
| 6,060,026 A | 5/2000 | Goldstein | |
| 6,086,668 A | 7/2000 | Farneth et al. | |
| 6,258,974 B1 | 7/2001 | Wellinghoff et al. | |
| 6,281,322 B1 | 8/2001 | Groth et al. | |
| 6,361,660 B1 | 3/2002 | Goldstein | |
| 6,368,535 B1 | 4/2002 | Katsoulis et al. | |
| 6,410,765 B1 | 6/2002 | Wellinghoff et al. | |
| 6,548,590 B1 | 4/2003 | Koloski et al. | |
| 6,589,457 B1 | 7/2003 | Li et al. | |
| 6,599,631 B2 | 7/2003 | Kambe et al. | |
| 6,634,576 B2 | 10/2003 | Verhoff et al. | |
| 6,649,713 B2 | 11/2003 | Tang et al. | |
| 6,695,617 B1 | 2/2004 | Wellinghoff et al. | |
| 6,696,585 B1 | 2/2004 | Wellinghoff et al. | |
| 6,743,936 B1 | 6/2004 | Wellinghoff et al. | |
| 6,812,268 B2 | 11/2004 | Schneider et al. | |
| 6,828,404 B2 | 12/2004 | Crivello | |
| 6,881,448 B1 | 4/2005 | Hattori | |
| 6,955,771 B2 | 10/2005 | Ryang | |
| 7,013,965 B2* | 3/2006 | Zhong et al. | 165/185 |
| 7,470,466 B2* | 12/2008 | Ippoliti et al. | 428/402 |
| 2002/0047058 A1 | 4/2002 | Verhoff et al. | |
| 2003/0024277 A1 | 2/2003 | Costa et al. | |
| 2003/0064086 A1 | 4/2003 | Carrion et al. | |
| 2003/0065121 A1 | 4/2003 | Lee | |
| 2003/0083401 A1 | 5/2003 | Schneider et al. | |
| 2003/0129654 A1 | 7/2003 | Ravkin et al. | |
| 2003/0207326 A1 | 11/2003 | Su et al. | |
| 2003/0228415 A1 | 12/2003 | Bi et al. | |
| 2003/0228682 A1 | 12/2003 | Lakowicz et al. | |
| 2004/0023253 A1 | 2/2004 | Kunwar et al. | |
| 2004/0115239 A1 | 6/2004 | Shastri et al. | |
| 2004/0146560 A1 | 7/2004 | Whiteford et al. | |
| 2004/0171779 A1 | 9/2004 | Matyjaszewski et al. | |
| 2004/0206448 A1 | 10/2004 | Dubrow | |
| 2004/0249006 A1 | 12/2004 | Gleason et al. | |
| 2004/0250950 A1 | 12/2004 | Dubrow | |
| 2005/0006800 A1 | 1/2005 | Mountziaris et al. | |
| 2005/0014283 A1 | 1/2005 | Matsuura et al. | |
| 2005/0019784 A1 | 1/2005 | Su et al. | |
| 2005/0038498 A1 | 2/2005 | Dubrow et al. | |
| 2005/0043894 A1 | 2/2005 | Fernandez | |
| 2005/0053542 A1 | 3/2005 | Harutyunyan | |
| 2005/0059755 A1 | 3/2005 | Schneider et al. | |
| 2005/0069573 A1 | 3/2005 | Cohn et al. | |
| 2005/0069718 A1 | 3/2005 | Voss-Kehl et al. | |
| 2005/0123611 A1 | 6/2005 | Barbe et al. | |
| 2005/0129580 A1 | 6/2005 | Swinehart et al. | |
| 2005/0158763 A1 | 7/2005 | Ivanisevic et al. | |
| 2005/0176843 A1 | 8/2005 | Burtscher et al. | |
| 2005/0208100 A1 | 9/2005 | Weber et al. | |
| 2005/0230659 A1 | 10/2005 | Hampden-Smith et al. | |
| 2005/0244954 A1 | 11/2005 | Blackburn et al. | |

FOREIGN PATENT DOCUMENTS

| | | |
|---|---|---|
| DE | 102 39 762 A1 | 3/2004 |
| EP | 1 254 372 | 6/2004 |
| EP | 1 283 195 | 10/2005 |
| EP | 1 171 496 | 12/2005 |

(Continued)

OTHER PUBLICATIONS

Honma, "Synthesis of organic/inorganic nanocomposites protonic conducting membrane through sol-gel processes", Solid State Ionics, Mar. 1, 1999, vol. 118 n 1-2, pp. 29-36.

(Continued)

*Primary Examiner*—H. (Holly) T Le
(74) *Attorney, Agent, or Firm*—Brooks, Cameron & Huebsch, PLLC

(57) ABSTRACT

Nanoparticle precursor structures, nanoparticle structures, and composite materials that include the nanoparticle structures in a polymer to form a composite material. The nanoparticle structures have chemical linkage moieties capable of forming non-covalent bonds with portions of a polymer for the composite material. Such composite materials are useful as biomaterials in medical devices.

12 Claims, No Drawings

FOREIGN PATENT DOCUMENTS

| | | |
|---|---|---|
| WO | WO 99/67425 | 12/1999 |
| WO | WO 00/56795 | 9/2000 |
| WO | WO 01/35100 | 5/2001 |
| WO | WO 01/62232 | 8/2001 |
| WO | WO 02/17883 | 3/2002 |
| WO | WO 02/32588 | 4/2002 |
| WO | WO 03/075888 | 9/2003 |
| WO | WO 2004/022121 | 3/2004 |
| WO | WO 2004/053205 | 6/2004 |
| WO | WO 2004/065295 | 8/2004 |
| WO | WO 2004/076056 | 9/2004 |
| WO | WO 2004/078641 | 9/2004 |
| WO | WO 2004/096944 | 11/2004 |
| WO | WO 2004/099068 | 11/2004 |
| WO | WO 2005/016824 | 2/2005 |
| WO | WO 2005/033001 | 4/2005 |
| WO | WO 2005/035238 | 4/2005 |
| WO | WO 2005/052591 | 6/2005 |
| WO | WO 2005/066286 | 7/2005 |
| WO | WO 2005/082277 | 9/2005 |
| WO | WO 2005/084582 | 9/2005 |
| WO | WO 2005/089825 | 9/2005 |
| WO | WO 2005/100633 | 10/2005 |
| WO | WO 2005/100642 | 10/2005 |

OTHER PUBLICATIONS

Honma,"Protonic conducting properties of sol-gel derived organic/inorganic nanocomposite membranes doped with acidic functional molecules",Solid St. Ionics,1999,v.120,p. 255-264.

Honma, "Protonic conducting organic/inorganic nanocomposites for polymer electrolyte membrane", Journal of Membrane Science, 2001, vol. 185, pp. 83-94.

Huang, "Structure-property behaviour of hybrid materials incorporating tetraethoxysilane with multifunctional poly(tetramethylene oxide)",Polymer,Nov. 1989,v.30 n 11,p. 2001-2012.

Young, "Covalent and non-covalently coupled polyester-inorganic composite materials", Polymer, 2002, vol. 43, pp. 6101-6114.

Zea Bermudez, V., et al., "Sol-gel derived urea cross-linked organically modified silicates", Chem. Mater., 1999, vol. 11, pp. 569-580.

Yano, "Physical properties and structure of organic-inorganic hybrid materials produced by sol-gel process", Materials Science & Engineering, Nov. 1998, vol. 6 n2-3, pp. 75-90.

Gomes Correia, S.M., et al., "Sol-gel-derived POE/siliceous hybrids doped with Na+ ions: Morphology and ionic . . . ", Solid State Ionics, Jan. 2003, vol. 156 n 1-2, pp. 85-93.

Bounor-Legare, "New transesterification between ester and alkoxysilane groups:application to ethylene-co-vinyl acetate copolymer crosslinking",Polymer,2002,vol. 43, p. 6085-6092.

Bounor-Legare, "A new route for organic-inorganic hybrid material synthesis through reactive processing without solvent", Polymer, 2004, vol. 45, pp. 1485-1493.

XP-002449175, Database CA [Online], Chem. Abstr. Service, Entered CAPLUS Nov. 23, 2005. Joubert, Mathieu, et al. "Synthesis of poly(.vepsiln-caprolactone)-silica . . . ". pp. 1-3.

XP-002449176, Database CA [Online], Chem. Abstr. Service, Entered CAPLUS Dec. 19, 2005. Boutti, Salima et al. "Silica/polyamide nanocomposite synthesis via an . . . ". pp. 1-2.

XP-002449177, Database CA [Online], Chem. Abstr. Service, Donley, M.S. et al. "The self-assembled nanophase particle (SNAP) process: a nanoscience . . . ". Dec. 12, 2003. pp. 1-2.

International Search Report, Sep. 17, 2007 (6 pgs).

* cited by examiner

NANOPARTICLE STRUCTURES COMPRISING SILICON OXIDE-BASED POLYMER, AND COMPOSITE MATERIALS

BACKGROUND OF THE DISCLOSURE

This application is a continuation of U.S. application Ser. No. 11/317,963 filed Dec. 23, 2005, the specification of which is incorporated herein by reference.

FIELD OF THE DISCLOSURE

Biomaterials research involves many areas of material science. The area of material science generally depends on the intended application of the biomaterial. For example, metals and metal alloys are used in orthopedics, dentistry and other load bearing applications; ceramics are used because of their chemically inert nature or their high bioactivity; polymers are used for soft tissue replacement and used for many other non-structural applications.

Regardless of their application, biomaterials are often required to maintain a balance between application specific mechanical properties and their biological effect on the body. So, biomaterial are often required to display a range of properties, such as biological activity (or inactivity), mechanical strength, chemical durability, etc. These aspects of biomaterial design are important to the successful application of the biomaterial to a given situation and/or application. Use of composite technology has enabled biomedical material researchers to develop a wide range of new biocomposites, which offer the promise to improve the quality of life of many people.

In a specific example, attempts have been made to incorporate ceramic and/or metallic nanoparticles into polymer matrices for the purpose of improving both the durability and surface characteristics (e.g., abrasion resistance) of polymers. However, the ceramic and/or metallic nanoparticles tend to conglomerate or clump when processed or mixed into the base polymer material. A suitable solution to this problem is desired.

DETAILED DESCRIPTION OF DISCLOSURE

The present disclosure provides nanoparticle precursor structures, nanoparticle structures and composite materials that include the nanoparticle structures in a polymer, where the composite materials can be suitable for use in medical devices. Composite materials having the polymer and nanoparticle structure of the present disclosure displays excellent performance in many characteristics important for medical device use, including compressive strength, diametral tensile strength, flexural strength, fracture toughness, puncture resistance, hardness, resistance to wear (e.g., characterized by compressive strength and diametral tensile strength), durability, thermal expansion, visual opacity, x-ray opacity, impact strength, chemical durability, electrical conductivity, biocompatibility, modulus, shelf life, patient comfort, ease-of-use, and structural integrity relative to a polymer without the nanoparticle structures of the present disclosure.

The addition of the nanoparticle structures to the polymer provides desirable levels of viscosity for composite material processing and strength for durability of the finished product relative to a polymer without the nanoparticle structures of the present disclosure. The nanoparticle structure of the present disclosure can also be used as a bulk material and/or a coating with or without the polymer.

As used herein, a "composite material" refers to a polymer that contains, at least in part, nanoparticle structures of the present disclosure, and any desired filler and/or adjuvants. The polymer and the nanoparticle structures each include chemical linkage moieties capable of forming non-covalent bonds that allow the components of the composite material to be dispersed, as discussed herein. Composite materials of the present disclosure can be multiple- or one-part compositions, as will be discussed herein.

As used herein, "dispersed" may be defined as a process or technique used to mix the nanoparticle structures of the present disclosure evenly throughout a polymer to form a mixture. As used herein a "mixture" can be defined as the state formed by two or more ingredients that do not bear a fixed proportion to one another and that, however commingled, are conceived as retaining a separate existence. As used herein, to "mix" can be defined as a process, operation or technique used to distribute the nanoparticle precursor and/or nanoparticle structures of the present disclosure evenly throughout a polymer. In other words, mixing reduces the nonuniformity of the mixture. Examples of such processes and/or techniques include, but are not limited to, mixing operations that reduce composition nonuniformity of the nanoparticle precursor structures and/or nanoparticle structures and the polymer. While the mixing process can result in production of a homogeneous product, a somewhat heterogeneous product is within the scope of this disclosure.

Examples of suitable mixing processes include, but are not limited to, the use of a batch mixer, a continuous mixer, a motionless mixer, and a screw extruder (single or twin barrel), among others. Surprisingly, the nanoparticle structures of the present disclosure can undergo melting, either alone or with the polymer, without significant thermal degradation.

The resulting nanoparticle structures are dispersed throughout the polymer to provide both mechanical and surface properties to the resulting composite material imparted through both the nanoparticle structure and the interactions of the nanoparticle structure with the polymer. In one embodiment, the nanoparticle structures can be dispersed by mixing the nanoparticles into a melt (i.e., a liquid state) of the polymer.

In addition, the composite material of the present disclosure can be further characterized in that it can be substantially insoluble in body fluids and tissues and that is designed and constructed to be placed in or onto the body or to contact fluid or tissue of the body. Ideally, the composite material will be biostable, biocompatible, and will not induce reactions in the body such as blood clotting, tissue death, tumor formation, allergic reaction, foreign body reaction (rejection) or inflammatory reaction; will have the physical properties such as strength, elasticity, permeability and flexibility required to function for the intended purpose; can be purified, fabricated and sterilized; and will substantially maintain its physical properties and function during the time that it remains implanted in or in contact with the body. A "biostable" material is one that is not broken down by the body, whereas a "biocompatible" material is one that is not rejected by the body.

As used herein, a "medical device" may be defined as a device that has surfaces that contact blood or other body fluids and/or tissues in the course of their operation. This can include, for example, extracorporeal devices for use in surgery such as blood oxygenators, blood pumps, blood sensors, tubing used to carry blood and the like which contact blood which is then returned to the patient. This can also include implantable devices such as vascular grafts, stents, electrical stimulation leads, valves for use in the cardiac system (e.g., heart valves), orthopedic devices, catheters, catheter shaft components, filters, guide wires, shunts, sensors, membranes, balloons, replacement devices for nucleus pulposus, cochlear or middle ear implants, intraocular lenses, coatings for such devices, and the like.

Nanoparticle structures and the composite material of the present disclosure can be used in medical devices as well as nonmedical devices. As discussed, they can be used in medical devices and are suitable as biomaterials. Examples of medical devices are listed herein. Examples of nonmedical devices include foams, insulation, clothing, footwear, paints, coatings, adhesives, and building construction materials, besides others.

As used herein, chemical linkage moieties capable of forming a "non-covalent bond" include those linkages that are capable of forming a chemical bond in that allow for non-bonded interactions due to van der Waals, electrostatic, and/or hydrogen bonding forces. For example, chemical linkage moieties capable of forming a "non-covalent bond" include those that can form hydrogen bonds such as, but not limited to, urethane linkages, amide linkages, ester linkages, and combination thereof.

As used herein, the term "organic group" is used for the purpose of this disclosure to mean a hydrocarbon group that is classified as an aliphatic group, cyclic group, or combination of aliphatic and cyclic groups (e.g., alkaryl and aralkyl groups). In the context of the present disclosure, suitable organic groups for polymeric hybrid precursors of this disclosure are those that do not interfere with the formation of the nanoparticle structure.

In the context of the present disclosure, the term "aliphatic group" means a saturated or unsaturated linear or branched hydrocarbon group. This term is used to encompass alkyl (e.g., —$CH_3$, which is considered a "monovalent" group) (or alkylene if within a chain such as —$CH_2$—, which is considered a "divalent" group), alkenyl (or alkenylene if within a chain), and alkynyl (or alkynylene if within a chain) groups, for example. The term "alkyl group" means a saturated linear (i.e., straight chain), cyclic (i.e., cycloaliphatic), or branched monovalent hydrocarbon group including, for example, methyl, ethyl, n-propyl, isopropyl, t-butyl, amyl, heptyl, dodecyl, octadecyl, 2-ethylhexyl, and the like. The term "alkenyl group" means an unsaturated, linear or branched monovalent hydrocarbon group with one or more olefinically unsaturated groups (i.e., carbon-carbon double bonds), such as a vinyl group. The term "alkynyl group" means an unsaturated, linear or branched monovalent hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. These hydrocarbon groups may be substituted with heteroatoms, which can be in the form of functional groups. The term "heteroatom" means an element other than carbon (e.g., fluorine, nitrogen, oxygen, sulfur, chlorine, etc.).

As a means of simplifying the discussion and the recitation of certain terminology used throughout this disclosure, the terms "group" and "moiety" are used to differentiate between chemical species that allow for substitution or that can be substituted and those that do not so allow for substitution or can not be so substituted. Thus, when the term "group" is used to describe a chemical substituent, the described chemical material includes the unsubstituted group and that group with nonperoxidic O, N, S, Si, or F atoms, for example, in the chain as well as carbonyl groups or other conventional substituents. Where the term "moiety" is used to describe a chemical compound, linkage or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

As used herein, the terms "a," "an," "the," "one or more," and "at least one" are used interchangeably and include plural referents unless the context clearly dictates otherwise. Unless defined otherwise, all scientific and technical terms are understood to have the same meaning as commonly used in the art to which they pertain. For the purpose of the present invention, additional specific terms are defined throughout.

The present disclosure relates to compounds of a nanoparticle precursor structure that include at least one silicon alkoxide having a chemical linkage moiety that can form a non-covalent bond for interaction with portions of a polymer. These compounds are of the formula (Formula I):

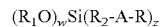

$$(R_1O)_wSi(R_2\text{-}A\text{-}R)_z$$

where A is the chemical linkage moiety that can form a non-covalent bond with a portion of a polymer. Each R, $R_1$, and $R_2$ can be the same or different (i.e., is independently) an organic group. Examples of such organic groups include a straight chain or branched alkyl group, a straight chain or branched alkylene group, where each R, $R_1$, and $R_2$ optionally includes heteroatoms that may be in the chain of the organic group or pendant therefrom as in a functional group. Each w and z can be independently 1 to 3.

The present disclosure also relates to compounds of a nanoparticle structure formed from the nanoparticle precursor structure of Formula I through, for example, a sol-gel process with at least one silicon alkoxide of the formula (Formula II):

$$Si(OR_3)_4$$

where $R_3$ is an organic group. Examples of the organic group include those defined herein for each of R, $R_1$, and $R_2$. The nanoparticle structure includes a core of a silicon-oxide based polymer with an organic group that extends from the core, where the silicon-oxide based polymer of the core is formed using a sol-gel process, and the organic group extending from the core includes a chemical linkage moiety that can form a non-covalent bond.

The resulting nanoparticle structure includes a compound of the formula (Formula III):

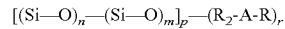

$$[(\text{Si}-\text{O})_n-(\text{Si}-\text{O})_m]_p-(R_2\text{-}A\text{-}R)_r$$

where A is the chemical linkage moiety that can form a non-covalent bond with a portion of the polymer. Each R and $R_2$ are independently an organic group, as defined herein. The value for each of "n", "m" and "p" is an average value in a polymeric range, with r being at least 25 percent (25%) of the value of n. The silicon-oxide based polymer $[(\text{Si}-\text{O})_n-(\text{Si}-\text{O})_m]_p$ forms a nanoparticle structure from which the groups $(R_2\text{-}A\text{-}R)_r$ extend.

As used herein, the "polymeric range" for the values for n, m, and p are each independently 1-100,000, 1-50,000, 1-10, 000, 1-5000, 1-2000, 1-1000, 1-500, 1-200, 1-100, 1-50, and 1-20, that provide for a number-average molecular weight for $[(Si-O)_n-(Si-O)_m]_p$ of 1,000,000 or more.

As used herein, a "core" of the silicon oxide based polymer includes a cross-linked network of silicon oxides of the formula $[(Si-O)_n-(Si-O)_m]_p$ having a size in the nanometer range (e.g., 1-1000 nanometers).

In one embodiment, each R is independently a straight chain or branched alkyl group optionally including heteroatoms, such as nitrogen, oxygen, phosphorus, sulfur, and halogen. The heteroatoms can be in the backbone of the R or pendant therefrom, and they can form functional groups. Such heteroatom-containing groups (e.g., functional groups) include, for example, an alcohol, carbonyl, ether, acetoxy, ester, aldehyde, acrylate, amine, amide, imine, imide, and nitrite, whether they be protected or unprotected. In one embodiment, R does not include heteroatoms. In an additional embodiment, each R is independently a straight chain or branched alkyl group includes 18 carbon atoms or less. In a further embodiment, each R is independently a straight chain or branched (C2-C18) alkyl group. In other embodiments, each R is independently a straight chain or branched (C2-C8) alkyl group (e.g., ethyl, n-propyl, isopropyl, butyl, pentyl, hexyl, hepyl, or octyl). In one example, R is a C4 alkyl group.

In one embodiment, each $R_1$ is independently a straight chain or branched alkyl group optionally including heteroatoms, such as nitrogen, oxygen, phosphorus, sulfur, and halogen. The heteroatoms can be in the backbone of the $R_1$ or pendant therefrom, and they can form functional groups. Such heteroatom-containing groups (e.g., functional groups) include, for example, an alcohol, carbonyl, ether, acetoxy, ester, aldehyde, acrylate, amine, amide, imine, imide, and nitrite, whether they be protected or unprotected. In one embodiment, $R_1$ does not include heteroatoms. In an additional embodiment, each $R_1$ is independently a straight chain or branched alkyl group includes 18 carbon atoms or less. In a further embodiment, each $R_1$ is independently a straight chain or branched (C2-C8) alkyl group. In other embodiments, each $R_1$ is independently a straight chain or branched (C2-C4) alkyl group (e.g., ethyl, n-propyl, isopropyl, or butyl). In one example, $R_1$ is a C2 alkyl group.

In one embodiment, each $R_2$ is independently a straight chain or branched alkylene group optionally including heteroatoms, such as nitrogen, oxygen, phosphorus, sulfur, and halogen. The heteroatoms can be in the backbone of $R_2$ or pendant therefrom, and they can form functional groups. Such heteroatom-containing groups (e.g., functional groups) include, for example, an alcohol, carbonyl, ether, acetoxy, ester, aldehyde, acrylate, amine, amide, imine, imide, and nitrite, whether they be protected or unprotected. In one embodiment, $R_2$ does not include heteroatoms. In an additional embodiment, each $R_2$ is independently a straight chain or branched alkylene group includes 18 carbon atoms or less. In a further embodiment, each $R_2$ is independently a straight chain or branched (C2-C8) alkylene group. In other embodiments, each $R_2$ is independently a straight chain or branched (C2-C4) alkylene group (e.g., ethylene, n-propylene, isopropylene, or butylene). In one example, $R_2$ is a C3 alkylene group.

In one embodiment, each $R_3$ is independently a straight chain or branched alkyl group optionally including heteroatoms, such as nitrogen, oxygen, phosphorus, sulfur, and halogen. The heteroatoms can be in the backbone of $R_3$ or pendant therefrom, and they can form functional groups Such heteroatom-containing groups (e.g., functional groups) include, for example, an alcohol, carbonyl, ether, acetoxy, ester, aldehyde, acrylate, amine, amide, imine, imide, and nitrile, whether they be protected or unprotected. In one embodiment, $R_3$ does not include heteroatoms. In an additional embodiment, each $R_3$ is independently a straight chain or branched alkyl group includes 18 carbon atoms or less. In a further embodiment, each $R_3$ is independently a straight chain or branched (C2-C8) alkyl group. In other embodiments, each $R_3$ is independently a straight chain or branched (C2-C4) alkyl group (e.g., ethyl, n-propyl, isopropyl, or butyl). In one example, $R_3$ is a C2 alkyl group.

As will be appreciated, each of R, $R_1$, and $R_3$ can be either an alkyl group, as discussed herein, or an alkyl moiety, and $R_2$ can be either an alkylene group, as discussed herein, or an alkylene moiety. In addition, for the formulas herein, R, $R_1$, $R_2$, and $R_3$ can vary within any one molecule. For example, in addition to each R and $R_2$ being the same or different within each $[(Si-O)_n-(Si-O)_m]_p-(R_2-A-R)_r$ group, the $R_2$-A-R group can be the same or different in any one molecule.

Methods of preparation of nanoparticle precursor structures, nanoparticle structures, and composite materials that include nanoparticle structures dispersed in a polymer are also provided. Nanoparticle precursor structures of the formula (Formula I): $(R_1O)_wSi(R_2-A-R)_z$ are capable of forming, either alone or with other precursor compounds (e.g., least one silicon alkoxide), a nanoparticle structure, as discussed herein.

Although certain nanoparticle precursor structures are described herein, the nanoparticle precursor structures used to form the nanoparticle structures of the present disclosure can be formed from a wide variety of silicon alkoxides having chemical groups that can form chemical linkage moieties capable of forming non-covalent bonds with portions of the polymer. For example, a method of preparing the nanoparticle precursor structures involves the combining of (1) silicon alkoxides having chemical groups that can form chemical linkage moieties capable of forming non-covalent bonds and (2) a reactive reagent that can form the nanoparticle precursor structure of the formula (Formula I): $(R_1O)_wSi(R_2-A-R)_z$.

The term "reactive reagent" in the context of the present disclosure is to be understood as meaning compounds which can act as solvents or diluents for the composition used for forming the nanoparticle precursor structure and also contain functional chemical groups that can reactant to covalently bond to the silicon alkoxide so as to form the chemical linkage moiety capable of forming non-covalent bonds.

Examples of nanoparticle precursor structures can be prepared from an amine-containing silicon alkoxide and the reactive reagent having the R group and at least one functional group reactive with the amine group on the silicon alkoxide, such as an acids, acyl chlorides, or amides to form an amide for the chemical linkage moiety, A in Formula I, capable of forming non-covalent bonds. Alternatively, one could react the amine group on the silicon alkoxide with an anhydride to make an imide for the chemical linkage moiety A.

In addition, nanoparticle precursor structures can be prepared from a hydroxyl containing silicon alkoxide and the reactive reagent having the R group and at least one functional group reactive with the hydroxyl group on the silicon alkoxide, such as an acids or acyl chlorides to form an ester for the chemical linkage moiety, A in Formula I, capable of forming non-covalent bonds.

Nanoparticles precursor structures can also be prepared from an isocyanate-containing silicon alkoxide and the reactive reagent having at least one functional group reactive with the isocyanate group, such as an alcohol and/or an amine to form a urethane and/or a urea for the chemical linkage moiety, A, in Formula I. In one example, a urethane- and/or a urea-containing nanoparticle precursor structure of the formula (Formula I): $(R_1O)_wSi(R_2\text{-}A\text{-}R)_z$, where A is the urethane- and/or a urea, are made using an isocyanate-containing silicon alkoxide. It should be understood, however, that a variety of polyols and/or polyamines can be used, including polyester, polyether, and polycarbonate polyols, for example. Furthermore, the polyols and polyamines can be aliphatic (including cycloaliphatic) or aromatic, including heterocyclic compounds, or combinations thereof.

Examples of suitable isocyanate-containing silicon alkoxide compounds for preparation of urethane or urea containing nanoparticles precursor structures of Formula I are typically aliphatic monoisocyantes, diisocyantes and triisocyantes, or combinations thereof. In addition to the isocyanate groups they can include other functional groups such as biuret, urea, allophanate, uretidine dione (i.e., isocyanate dimer), and isocyanurate, etc., that are typically used in biomaterials. In one example, the isocyanate-containing silicon alkoxide can be 3-(triethoxysilyl)propyl isocyanate (Sigma-Aldrich, Milwaukee, Wis.).

Examples of suitable alcohols include anhydrous alcohol such as methanol, ethanol, propanol, butanol, pentanol, and mixtures thereof. Suitable alcohols have a water content of less than about 1% by weight, especially less than about 0.5% by weight or less than about 0.1% by weight. Other organic solvent(s) (or mixtures of solvents) can also be used that are miscible with the other components.

The present disclosure further provides methods of forming the nanoparticle structure as discussed herein. The nanoparticle structure of Formula III: $[(Si\text{—}O)_n\text{—}(Si\text{—}O)_m]_p\text{—}(R_2\text{-}A\text{-}R)_r$ includes the core of the silicon-oxide based polymer (e.g., $[(Si\text{—}O)_n\text{—}(Si\text{—}O)_m]_p$ from which extend the organic group (e.g., $\text{—}(R_2\text{-}A\text{-}R)_r$) that include the chemical linkage moieties (e.g., "A") capable of forming non-covalent bonds with portions of the polymer. In one embodiment, the nanoparticle structure can be formed from the nanoparticle precursor structure of Formula I: $(R_1O)_wSi(R_2\text{-}A\text{-}R)_z$, through, for example, a sol-gel process with at least one silicon alkoxide of Formula II: $Si(OR^3)_4$, as discussed herein.

Although certain nanoparticle structures are described herein, the nanoparticle structures of the present disclosure can be formed from a wide variety of silicon alkoxides of Formula I and the nanoparticle precursor structure of Formula II. For example, a method of preparing the nanoparticle structures involves the combining of (1) the nanoparticle precursor structure of Formula I with (2) at least one silicon alkoxide of Formula II to form a reaction mixture allowing the nanoparticle structures to form in the reaction mixture.

In one embodiment, the nanoparticle structures can be formed through sol-gel processes. It has been surprisingly found that sol-gel derived nanoparticle structures impart superior characteristics to composites used for biomaterials. Moreover, it was surprisingly found that sol-gel derived nanoparticle structures can be incorporated into polymers at higher levels than is conventional possible.

The Sol-gel processes is generally described, for example, in "Sol-Gel Science: The Physics and Chemistry of Sol-Gel Processing" (Brinker et al., Academic Press, 1990). As used herein, "sol-gel" refers to any method of synthesizing nanoparticle structures that comprises a step where at least one of the precursors is an aqueous or organic dispersion, sol, or solution.

A method for preparing the sol-gel derived nanoparticle structures for the present disclosure involves the combining of (1) an aqueous or organic dispersion or sol of the nanoparticle precursor structure of Formula I: $(R_1O)_wSi(R_2\text{-}A\text{-}R)_z$ with (2) an aqueous or organic dispersion, sol, or solution of the desired at least one silicon alkoxide of Formula II: $Si(OR_3)_4$.

Examples of suitable compounds of Formula I $(R_1O)_wSi(R_2\text{-}A\text{-}R)_z$ include 3-(triethoxysilyl)propyl isocyanate, and the like. Examples of suitable silicon alkoxide of Formula II: $Si(OR_3)_4$ include tetraethoxysilane (TEOS), and the like.

The nanoparticle structures can then be used as a bulk material by itself or with one or more additives. The nanoparticle structures can also be used to form a coating. For example, nanoparticle structures in a solvent can be applied directly to a surface as a coating, where upon solvent evaporation the coating of the nanoparticle structures is formed. In addition, the nanoparticle structures can also undergo additional processing techniques to, for example, spin fibers, precipitate particles of the nanoparticle structures and/or form gels of the nanoparticle structures. In addition, the nanoparticle structures can be combined with an appropriate polymer to form the composite material of the disclosure. Blends of various silicon alkoxide of Formula II and/or Formula I are also contemplated.

In one embodiment, the nanoparticle structures are substantially unaggregated, where mixtures of these nanoparticle structures are also contemplated, as well as combination nanoparticle structures made from organic and inorganic materials.

A wide variety of polymers can be used with the present disclosure in forming the composite material. Polymers suitable for use in the composite material of the present disclosure can include those having sufficient strength, hydrolytic stability, and non-toxicity to render them suitable for use in a biological environment. Polymers of the present disclosure in which the nanoparticle structure can be dispersed may be copolymers, random, alternating, block, star block, segmented copolymers (i.e., containing a multiplicity of both hard and soft domains or segments on any polymer chain), or combinations thereof (e.g., where certain portions of the molecule are alternating and certain portions are random). In addition, polymers of the present disclosure can be linear, branched, or crosslinked.

The polymers suitable for forming the composite material according to the present disclosure further include, but are not limited to, chemical linkage moieties that have the ability to form non-covalent bonds. Examples of such polymers include those having urethane linkages, ester linkages, amide linkages, imide linkages, urea linkages, carbonate linkages, sulfone linkages, ether linkages, and/or phosphonates linkages for the chemical linkage moieties, or combinations thereof. Examples of such polymers include polyamide (nylon), polyurethane, polyureas, polyurethane-ureas, and polyester, among others.

In addition, polymers suitable for forming the composite material according to the present disclosure can include both hard and soft segments. As used herein, a "hard" segment is one that is either crystalline (i.e., has ordered domains) at use temperature or amorphous with a glass transition temperature above use temperature (i.e., glassy), and a "soft" segment is one that is amorphous with a glass transition temperature below use temperature (i.e., rubbery). Typically, hard segments add considerable strength and higher modulus to the polymer. Similarly, soft segment adds flexibility and lower modulus, but may add strength particularly if it undergoes strain crystallization, for example. The polymers can vary from hard and rigid to soft and flexible. In one example, the polymers are elastomers. An "elastomer" is a polymer that is capable of being stretched to approximately twice its original length and retracting to approximately its original length upon release.

Suitable polymers can have a viscosity and molecular weights suitable for blending and/or melt processing with the nanoparticle structures discussed herein. In addition to the polymers described herein, the composite material of the disclosure can also include a variety of additives. These can include antioxidants, colorants, processing lubricants, stabilizers, imaging enhancers, fillers, and the like. The present disclosure also provides polymers and compounds used to form such polymers, and biomaterials formed from such polymers that can be used in medical devices.

Additional additives can also include, but are not limited to, metal alkoxides $M(OR_2)_n$, where the value for n is dependent on the oxidation state of the metal M. In one embodiment, the metal alkoxides can be incorporated into mixture of the nanoparticle precursor structure and/or the polymer the prior to the sol-gel process. In one embodiment, M can be selected from the group of metals consisting of Groups 2, 4, 5, 8, 9, 13, 14 and 15. For example, M can be selected from the group of metals consisting of Si, Fe, Ti, Zr, Ir, Ru, Bi, Ba, Al, Ta, and Sr. In an alternative embodiment, the examples of M can include non-metal element C and a polyhedral oligomeric silsesquioxane (POSS). Addition of the additives such as the metal alkoxide can then be used in the sol-gel process to modify the nature of the resulting nanoparticle structure and/or the composite material.

The composite materials of this disclosure include nanoparticle structures of the present disclosure (e.g., Formula III) dispersed in the matrix of a polymer. Dispersing the nanoparticle structures into the polymer can include blending the nanoparticle structures into the polymer to form a homogeneous mixture, as discussed herein. In one embodiment, methods of blending the nanoparticle structures into the polymer can include mixing processes that distribute, incorporate and blend the nanoparticle structures into the polymer. For better incorporation into the polymer matrix it is advantageous for the nanoparticle structures to include chemical linkage moieties that can form non-covalent bonds, as discussed herein. The use of nanoparticle structures having chemical linkage moieties that can form non-covalent bonds can enable non-covalent bonding with polymer within a matrix to be achieved. Such non-covalent bonding can allow the core of the silicon oxide based polymer to be incorporated without separating from the polymer matrix. This miscibility would not other wise be possible without the non-covalent bonding interaction of the chemical linkage moieties of the nanoparticle structures and the polymer as provided herein.

In an alternative embodiment, the nanoparticle structures of Formula III can be formed from the compounds of Formula I and II, as discussed herein, in situ with the polymer present in the reaction mixture. For example, the polymer can be combined with the reactive reagent (e.g., an alcohol) and brought into solution under reflux conditions. As used herein, "solution" does not require complete solubility of the solid but may allow for some undissolved solid, as long as there is a sufficient amount of the solid dissolved in the reactive reagent for processing. Silicon alkoxides having chemical groups that can form chemical linkage moieties capable of forming non-covalent bonds can then be added to the reaction mixture under reflux to form the nanoparticle precursor structure of the Formula I: $(R_1O)_w Si(R_2\text{-}A\text{-}R)_z$ in the polymer mixture. One or more silicon alkoxides of Formula II can then be added to form the nanoparticle structures in situ through, for example, sol-gel processes, as discussed herein.

Methods of preparing the nanoparticle precursor structures, the nanoparticles, and the composite materials that include the nanoparticle structures in the polymer are also provided. In a typical reaction, the compound(s) of Formula I, as described herein, and the at least one silicon alkoxide compound of Formula II are combined in a cross-linking process to form the nanoparticle structure of Formula III. An example of such a cross-linking process includes the sol-gel process Three reactions are generally used to describe the sot-gel process: hydrolysis, alcohol condensation, and water condensation. The characteristics and properties of the nanoparticle structure of Formula III formed through the sol-gel process can be related to a number of factors that affect the rate of hydrolysis and condensation reactions, such as, pH, temperature and time of reaction, reagent concentrations, catalyst nature and concentration, aging temperature and time, and drying. Controlling these factors allow for the structure and properties of the sol-gel-derived nanoparticle structure of Formula III to be varied as desired.

A method for preparing the nanoparticle structure for the present disclosure through a sol-gel process involves the combining of (1) the mixture of the compound(s) of Formula I and the least one silicon alkoxide of Formula II and (2) an aqueous or organic dispersion or sol of reagents that include at least one alcohol and a catalyst provided under conditions for the sol-gel reaction to take place.

Examples of suitable catalysts include mineral acids such as hydrochloric acid (HCl), ammonia, acetic acid, potassium hydroxide (KOH), titanium alkoxides, vandium alkoxides, amines, KF, and HF. Additionally, it has been observed that the rate and extent of the hydrolysis reaction is most influenced by the strength and concentration of the acid- or base-catalyst. In one embodiment, the concentration of the acid- or base-catalyst can be from 0.01 M to 7 M. In addition, the nature of the nanoparticle structure can be influenced by the selection of an acid or base catalyst, where under acid-catalyzed conditions the nanoparticle structure yields primarily linear or randomly branched polymers which entangle and form the nanoparticle structure. On the other hand, nanoparticle structures derived under base-catalyzed conditions can yield more highly branched clusters which do not interpenetrate prior to gelation and thus behave as discrete clusters.

Examples of suitable alcohols include anhydrous alcohol such as methanol, ethanol, propanol, butanol, pentanol, and mixtures thereof. Suitable alcohols have a water content of less than about 1% by weight, especially less than about 0.5% by weight or less than about 0.1% by weight. Other organic solvent (or mixtures of solvents) can also be used that are miscible with the other components.

According to the present disclosure, the sol-gel reaction can take place with the reagents in either a liquid phase and/or a gas phase. Typical reaction conditions for the sol-gel reaction can occur in a temperature range of 20° C. to 100° C. Other temperature ranges are also possible.

Such methods are exemplary only. The present disclosure is not limited by the methods described herein for making the compounds of Formula III or the composite materials derived from the compounds of Formula III.

The invention has been described with reference to various specific and preferred embodiments. It is understood, however, that there are many extensions, variations, and modification on the basic theme of the present invention beyond that shown in the detailed description, which are within the spirit and scope of the present invention.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments set forth herein and that such embodiments are presented by way of example only with the scope of the disclosure intended to be limited only by the claims set forth herein as follows.

What is claimed is:

1. A nanoparticle comprising a silicon-oxide based core of a polymer with an organic compound that extends from the core, where the silicon-oxide based polymer is formed using a sol-gel process, and the organic compound has a chemical linkage moiety that is selected to form a non-covalent bond to link a portion of the silicon-oxide based polymer.

2. The nanoparticle of claim 1, where the silicon-oxide based polymer of the core is formed using a nanoparticle precursor structure of the formula $(R_1O)_w Si(R_2\text{-}A\text{-}R)_z$ and at least one silicon alkoxide of the formula $Si(OR_3)_4$ in the sol-gel process, where A is the chemical linkage moiety that is selected to form the non-covalent bond, R, $R_1$, $R_2$ and $R_3$ are each independently an organic group, and w and z are each independently 1 to 3.

3. The nanoparticle of claim 2, where each R, $R_1$ and $R_3$ is independently a (C2-C18)alkyl group, and $R_2$ is a (C2-C18) alkylene group.

4. The nanoparticle of claim 2, where A is a urethane group.

5. The nanoparticle of claim 2, where A is a urea group.

6. The nanoparticle of claim 5, where R is a (C2-C8)alkyl group and $R_2$ is a (C2-C18)alkylene group.

7. The nanoparticle of claim 1, where the nanoparticle includes a compound of the formula $[(Si\text{---}O)_n\text{---}(Si\text{---}O)_m]_p\text{---}(R_2\text{-}A\text{-}R)_r$; where A is the chemical linkage moiety that is selected to form a non-covalent bond to link the portion of the polymer, R and $R_2$ are each independently an organic group; n, m and p are each independently in a polymeric range; and r is at least 25 percent of n.

8. A composite material, comprising:
a polymer having non-covalent bonding groups; and
a nanoparticle dispersed in the polymer, where the nanoparticle includes a silicon-oxide based core of the polymer with an organic compound that extends from the core, where the silicon-oxide based polymer is formed using a sol-gel process, and the organic compound has a chemical linkage moiety that is selected to form a non-covalent bond to link a portion of the silicon-oxide based polymer.

9. The composite material of claim 8, where the silicon-oxide based core of the polymer is formed using a nanoparticle precursor structure of the formula $(R_1O)_w Si(R_2\text{-}A\text{-}R)_z$ and at least one silicon alkoxide of the formula $Si(OR_3)_4$ in the sol-gel process, where A is the chemical linkage moiety that is selected to form the non-covalent bond R, $R_1$, $R_2$ and $R_3$ are each independently an organic group, and w and z are each independently 1 to 3.

10. The composite material of claim 9, where A is a urethane group.

11. The composite material of claim 9, where A is a urea group.

12. The composite material of claim 9, where each R, $R_1$, and $R_3$ is independently a (C2-C8)alkyl group, and $R_2$ is a (C2-C18)alkylene group.

* * * * *